US010715527B2

(12) United States Patent
Dumoulin et al.

(10) Patent No.: US 10,715,527 B2
(45) Date of Patent: Jul. 14, 2020

(54) METHOD OF MANAGING PROFILES IN A SECURE ELEMENT

(71) Applicant: OBERTHUR TECHNOLOGIES, Colombes (FR)

(72) Inventors: Jerome Dumoulin, Colombes (FR); Alexis Michel, Colombes (FR)

(73) Assignee: IDEMIA France, Colombes (FR)

( * ) Notice: Subject to any disclaimer, the term of this patent is extended or adjusted under 35 U.S.C. 154(b) by 282 days.

(21) Appl. No.: 15/740,377

(22) PCT Filed: Jun. 28, 2016

(86) PCT No.: PCT/FR2016/051605
§ 371 (c)(1),
(2) Date: Dec. 28, 2017

(87) PCT Pub. No.: WO2017/001770
PCT Pub. Date: Jan. 5, 2017

(65) Prior Publication Data
US 2018/0198797 A1     Jul. 12, 2018

(30) Foreign Application Priority Data

Jun. 30, 2015    (FR) ..................................... 15 56148

(51) Int. Cl.
*H04L 29/06*      (2006.01)
*G06F 21/31*      (2013.01)
(Continued)

(52) U.S. Cl.
CPC ............ *H04L 63/102* (2013.01); *G06F 21/31* (2013.01); *H04L 9/3226* (2013.01);
(Continued)

(58) Field of Classification Search
CPC ..... G06F 21/31; H04L 63/102; H04L 63/083; H04L 63/0853; H04L 63/12; H04L 9/3226; H04L 9/3234; H04L 67/30
See application file for complete search history.

(56) References Cited

U.S. PATENT DOCUMENTS 8,965,366 B1 *   2/2015   Somayajula ......... H04W 60/00
                                                     370/328
9,351,162 B2 *   5/2016   Nix ......................... H04L 63/06
(Continued)

OTHER PUBLICATIONS

GSMA: "Official Document 12FAST.13—Embedded SIM Remote Provisioning Architecture Version 1.1," Dec. 2013, Retrieved from Internet: www.gsma.com/connectedliving/wp-content/uploads/2014/01/1.-GSMA-Embedded-SIM-Remote-Provisioning-Architecture-Version-1.1.pdf, 84 pages.
(Continued)

*Primary Examiner* — Hee K Song
(74) *Attorney, Agent, or Firm* — Young & Thompson

(57) ABSTRACT

A method of managing profiles in a secure element where the secure element includes an active first profile associated with a first communication network and a second profile associated with a second communication network. The method includes deactivating the first profile and activating the second profile, where the deactivation and the activation are implemented following detection of a failure during a local verification pertaining to the first profile for the use of this the first profile. A local verification may be a verification in the secure element of the authorization of access of a user to the first profile, for example three failures of PIN or PUK code or of biometric authentication data, the local verification being performed in the secure element, and the failure being relative to a security failure of the first profile or to an operating failure of the first profile.

20 Claims, 4 Drawing Sheets

(51) Int. Cl.
*H04L 9/32* (2006.01)
*H04L 29/08* (2006.01)

(52) U.S. Cl.
CPC .......... *H04L 9/3234* (2013.01); *H04L 63/083* (2013.01); *H04L 63/0853* (2013.01); *H04L 63/12* (2013.01); *H04L 67/30* (2013.01)

(56) References Cited

U.S. PATENT DOCUMENTS

| | | | | |
|---|---|---|---|---|
| 9,426,731 | B1* | 8/2016 | Uy | H04W 48/18 |
| 9,510,186 | B2* | 11/2016 | Li | H04W 8/183 |
| 10,484,861 | B2* | 11/2019 | Wozniak | H04W 12/08 |
| 2014/0031012 | A1* | 1/2014 | Park | H04W 12/06 |
| | | | | 455/411 |
| 2014/0038563 | A1* | 2/2014 | O'Leary | H04W 8/22 |
| | | | | 455/411 |
| 2014/0073375 | A1* | 3/2014 | Li | H04W 8/183 |
| | | | | 455/558 |
| 2014/0140507 | A1* | 5/2014 | Park | H04W 8/245 |
| | | | | 380/247 |
| 2015/0094011 | A1* | 4/2015 | Haessler | H04W 4/90 |
| | | | | 455/404.1 |
| 2016/0088464 | A1* | 3/2016 | Hans | H04W 8/183 |
| | | | | 455/558 |
| 2016/0316410 | A1* | 10/2016 | Tan | H04W 36/30 |
| 2016/0352698 | A1* | 12/2016 | Long | H04W 12/08 |
| 2017/0041864 | A1* | 2/2017 | Kaliner | H04W 8/205 |
| 2017/0134948 | A1* | 5/2017 | Gao | H04W 12/06 |
| 2017/0150344 | A1* | 5/2017 | Li | H04W 8/183 |
| 2017/0171738 | A1* | 6/2017 | Faure | H04W 4/60 |
| 2017/0187703 | A1* | 6/2017 | Enrique Salpico | G06F 21/44 |
| 2017/0215063 | A1* | 7/2017 | Wozniak | H04W 8/183 |
| 2018/0004736 | A1* | 1/2018 | Zhao | H04W 8/18 |

OTHER PUBLICATIONS

GSMA "GSM Association Non-Confidential Official Document 12FAST.15—Remote Provisioning Architecture for Embedded UICC Technical Specification Remote Provisioning Architecture for Embedded UICC Technical Specification Security Classification: Non-Confidential GSM Association Non-Confidential Official Document," Dec. 2013, Retrieved from Internet: www.gsma.com/connectedliving/wp-content/uploads/2014/01/2.-GSMA-Remote-Provisioning-Architecture-for-Embedded-UICC-Technical-Specification-Version-1.0.pdf, 294 pages.

International Search Report issued in Application No. PCT/FR2016/051605, dated Oct. 7, 2016.

* cited by examiner

METHOD OF MANAGING PROFILES IN A SECURE ELEMENT

BACKGROUND OF THE INVENTION

Field of the Invention

The present invention relates to a method of managing profiles in a secure element.

A secure element such as, for example, a chip card, is employed in a host device. The host device is, for example, a mobile telephone, or another mobile telecommunication terminal, such as a tablet.

Description of the Related Art

A secure element can be removably integrated in the host device, such as, for example, a card of the UICC type (which stands for "Universal Integrated Circuit Card") described in standard ETSI TS 102 221, which includes conventional chip cards of SIM card type (or USIM—for "Universal Subscriber Identity Module"), but also secure tokens, all of which are identifiable in a unique manner. The second type of secure element described can be embedded (for example soldered) in the host device, such as, for example, a card of the eUICC type (which stands for "embedded Universal Integrated Circuit Card") described in standard ETSI TS 103 383. An embedded secure element designated as an "eSE" is known in English-language terminology as an "embedded secure element", and is described in GlobalPlatform Card Specification Version 2.2.1 relating to GlobalPlatform technology.

Accordingly, a user of the host device can replace a first card of the UICC type with a second card of the UICC type, for example if he wishes to switch over from a first communication network, managed by a first operator, to a second communication network, managed by a second operator, who may be the same operator.

It will be observed that a communication network comprises a series of facilities used by an operator, which permit the connection and the connectivity of its subscribers. Two communication networks, specifically mobile telephone networks, may employ the same infrastructure, with the exception of a number of facilities which are specific to each operator.

It will be observed that a user cannot easily replace a card of the eUICC type in their host device.

Secure elements, whether embedded or otherwise, can nevertheless operate according to different profiles which are saved in the memory, in order to switch over from a first communication network, managed by one operator, to a second communication network, managed by a second operator, who may be identical to the first operator. Each profile is identified, in the secure element, by a unique identifier.

According to standard GSMA 12FAST.15, a profile is a combination of a file structure, data and applications which are available or present in the secure element, and which permits access to a telecommunication network infrastructure, when said profile is activated.

A profile is active when the file structure and/or applications can be selected via an interface of the host device which contains the secure element, such as a card of the eUICC type or UICC type.

Standards GSMA 12FAST.13 and GSMA 12FAST.15 define a procedure for the activation of profiles, specifically by means of ad hoc commands.

Moreover, these standards provide for an alternative or fall-back activation procedure, or an alternative or fall-back mechanism for the automatic switchover from an active profile to a fall-back profile under specific operating conditions.

This fall-back procedure is specifically triggered when the secure element, such as a card of the eUICC type, loses the connection to the communication network infrastructure to which it was previously connected using the profile which has been activated, or the "active profile". This procedure is described in para 3.16 of the standard GSMA 12FAST.15, and in para 3.5.13 of the standard GSMA 12FAST.13.

During this procedure, the secure element deploys the deactivation of the active profile and the activation of another profile, which is identified by an activated fall-back Attribute.

According to the standards GSMA 12FAST.13 and GSMA 12FAST.15, the fall-back Attribute is an attribute which permits the identification of the profile which is to be activated in the fall-back mechanism. Only one profile at a time in a card of the eUICC type can assume the activated fall-back attribute (see para 4.1.1.7 of the standard GSMA 12FAST.15).

Thus, when a card of the eUICC type, or any secure element, loses its connection with a first communication network via a profile which is associated with the first communication network, it can automatically switch over to a second communication network, using a second profile which is associated with the second communication network, wherein the second profile is activated by the fall-back procedure.

A connection and connectivity are thus restored to the eUICC.

The existing management of profiles proposed by these standards is not satisfactory.

BRIEF SUMMARY OF THE INVENTION

The present invention proposes the improvement of this situation.

To this end, according to a first aspect, the present invention proposes a method of managing profiles in a secure element, wherein the secure element comprises a first profile associated with a first communication network, and a second profile associated with a second communication network, wherein the first profile is active, and the method comprises:

deactivating the first profile; and
activating the second profile.

The method of managing profiles is characterized in that the deactivation and activation are deployed following the detection of a failure during a local verification pertaining to said first profile for the use of this said first profile.

Obviously, such detection can comprise one or more verification(s) pertaining to the first profile, for example, security verifications relating to the first profile. Deactivation and activation are then deployed in response to a failure of verification.

The verification(s) is/are deployed in the secure element, i.e. these are local verifications.

Thus, when a failure is detected, the secure element implements the activation of the second profile, in place of the defective first profile. The secure element can then be operated using the second profile, without remaining inoperative.

In other words, the availability of the secure element for use is restored, whereas the active first profile is defective or blocked.

Indeed, in addition to the loss of connection to the communication network infrastructure, as provided in the standard, there are other situations in which the secure element, and the host device containing the secure element, are rendered unusable, and thus incapable of connection to the communication network.

This applies, for example, when the secure element deploys verifications relating to the security of operation of a host device using a profile, such as the verification of the authentication of a user, or of the communication network infrastructure, or of the integrity of data or applications downloaded in the secure element, thereby modifying the active profile and compromising its functional integrity.

According to one characteristic, the secure element is non-removably installed in a host device.

According to one characteristic, the method of managing profiles comprises a generation, for the attention of a host device connected to said secure element, of a restart command for the secure element, in order to initiate a procedure for the association of the secure element with the second communication network, using the second activated profile.

According to a further characteristic, the method of managing profiles comprises a e notification of the deactivation of the first profile and the activation of the second profile, to the infrastructures associated respectively with the first and second communication networks.

According to one form of embodiment, local verification comprises a verification in the secure element of the authorization of access of a user to said first profile. In this case, a security failure is detected in the secure element in the event of the failure of verification.

Authorization for the access of a user to the first profile is verified accordingly. Obviously, other conditions can be considered in the determination of whether the verification has resulted in a failure. For example, in the examples considered below, it is common to wait for three failed checks of a PIN-type code before initiating a security action, for example the blocking of the card. A security failure is detected when the card is blocked.

According to one characteristic, verification in the secure element of the authorization for the access of a user comprises the verification of a personal identification number (PIN) associated with the first profile.

According to a further characteristic, verification in the secure element of the authorization for the access of a user comprises the verification of a personal unblocking key (PUK) associated with the first profile.

According to a particular characteristic, the method of managing profiles comprises a blocking of the active profile of the secure element, in the event of the failure of verification. Accordingly, when the active profile is blocked, further to a verification pertaining to the security of said active profile, the secure element will be rendered unusable using this profile.

For example, where a failure occurs during a verification of security pertaining to the active profile, an error message containing representative information for said failure is generated.

According to a further characteristic, verification in the secure element of the authorization of the access of a user comprises the verification of authentication data for said user.

Authorization of a communication network for access to the first profile is verified accordingly.

In one form of embodiment, local verification comprises a verification of the integrity of the first profile, in order to detect the corrupted operation of the latter.

Verification of the corrupted or non-corrupted operation of the first profile, and/or of functionalities which are directly dependent upon said first profile, is provided accordingly.

Operation of the first profile may be defective where the first profile is modified with erroneous or corrupted data.

According to one characteristic, verification of the integrity of said first profile is executed during an activation phase of said first profile.

According to one characteristic, the method of managing profiles further comprises a reactivation of the first profile, wherein the reactivation comprises the deactivation of the second profile and the activation of the first profile.

Accordingly, once the first profile has been deactivated and the second profile has been activated, the first profile is reactivated.

According to one form of embodiment, the reactivation of the first profile is deployed upon the reception, in said secure element, of a request for the activation of the first profile, wherein the activation request originates from the first communication network, associated with the first profile.

According to one characteristic, the request for the activation of the first profile is generated at the request of a user.

Alternatively, the request for the activation of the first profile is generated upon the expiry of a predetermined time interval, with effect from a notification of the deactivation of said first profile in the secure element.

According to a second aspect, the invention relates to a secure element comprising a first profile, associated with a first communication network, and a second profile, associated with a second communication network, wherein the first profile is active, and the secure element is configured to:

deactivate the first profile; and activate the second profile;

wherein the secure element is configured such that the deactivation and activation are carried out following the detection of a failure during a local verification pertaining to said first profile for the use of this said first profile.

According to one characteristic, the secure element is a card of the embedded UICC type (eUICC).

According to a third aspect, the invention relates to a host device incorporating a secure element according to the invention.

In one form of embodiment, the host device is a portable communication terminal.

The secure element and the host device have characteristics and advantages which are analogous to those described above with respect to the method of managing profiles.

Further specific features and advantages of the invention will be apparent from the following description.

BRIEF DESCRIPTION OF THE DRAWINGS

In the attached drawings, which are provided by way of non-limiting examples.

DETAILED DESCRIPTION OF THE PREFERRED EMBODIMENTS

Figure 1:
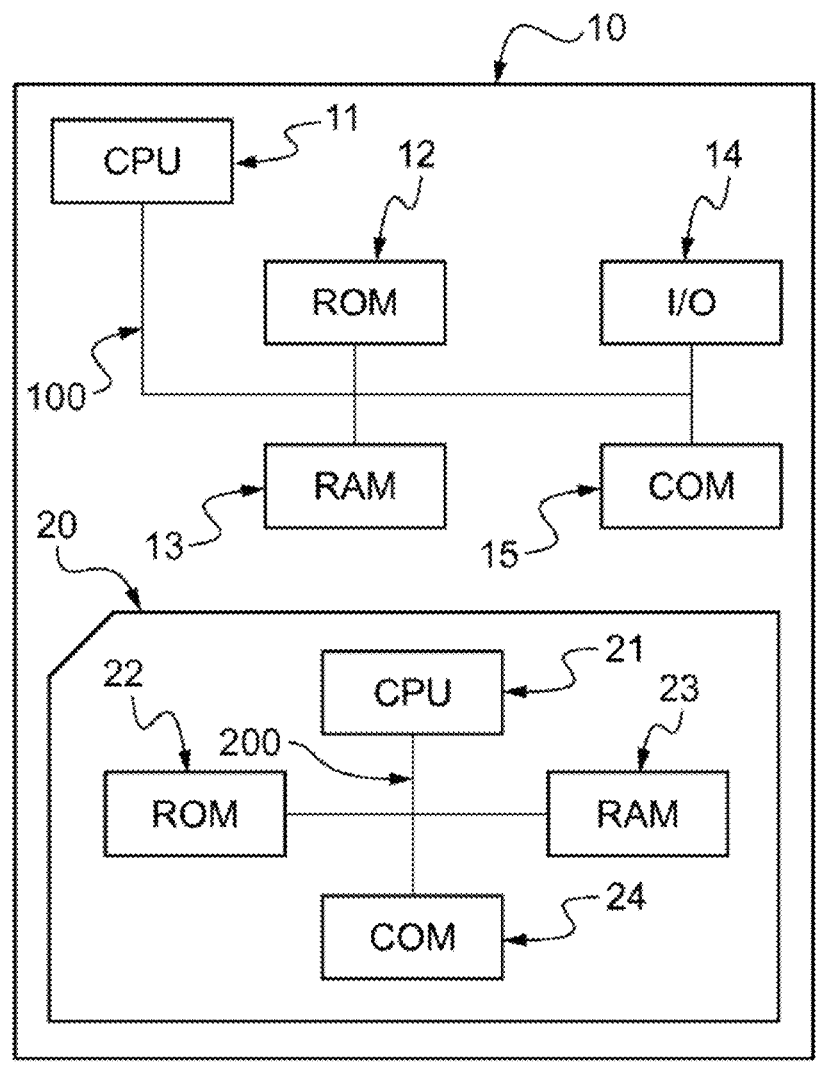
FIG. 1 shows a schematic representation of a host device comprising an embedded secure element, according to one form of embodiment of the invention.

FIG. 1 shows a schematic representation of a host device 10, comprising a secure element 20 according to one form of embodiment of the invention.

The host device 10 is, for example, a portable terminal, a mobile telephone, a tablet computer or any type of electronic device, such as an electric meter, a vehicle, a coffee machine, etc. The secure element 20 is incorporated in the host device 10.

The host device 10 comprises a communication bus 100, to which the following are connected:
- a processing unit 11, identified on the figure by "CPU" (which stands for "Central Processing Unit"), and which can comprise one or more processors;
- a non-volatile memory 12, for example ROM (which stands for "Read Only Memory"), EEPROM (which stands for "Electrically Erasable Read Only Memory"), or a flash memory;
- a live memory 13 or RAM (which stands for "Random Access Memory");
- an input/output interface 14, identified on the figure by "I/O" (which stands for "Input/Output"), for example, a monitor, a keyboard, a mouse or another pointer device, such as a touchscreen or a remote control device which permits a user to interact with the system via a graphical interface; and
- a communication interface 150, identified on the figure by "COM", which is designed for the exchange of data, for example with a SM-SR server via a network, or via a read/write interface.

The secure element 20 is, for example, an embedded universal integrated circuit card (eUICC), according to standard ETSI TS 103 383 or ETSI 102 221.

It comprises a communication bus 200, to which the following are connected:
- a processing unit 21 or microprocessor, identified on the figure by "CPU" (which stands for "Central Processing Unit");
- a non-volatile memory 22, for example ROM (which stands for "Read Only Memory"), EEPROM (which stands for "Electrically Erasable Read Only Memory"), or a flash memory;
- a live memory 23 or RAM (which stands for "Random Access Memory"); and
- a communication interface 24, identified on the figure by "COM", which is designed for the exchange of data with the processor 11 of the host device 10.

The live memory 23 comprises registers which are designed for the recording of variables and parameters which are created and modified in the course of execution of a computer program comprising instructions for the deployment of a method according to the invention. Instruction codes for the program stored in the non-volatile memory 22 are loaded into the RAM memory 23, for execution by the CPU processing unit 21.

The non-volatile memory 22 is, for example, a rewritable memory of the EEPROM or flash memory type, which may constitute a medium within the meaning of the invention, i.e. which may comprise a computer program containing instructions for the deployment of methods according to the invention.

Figure 2:
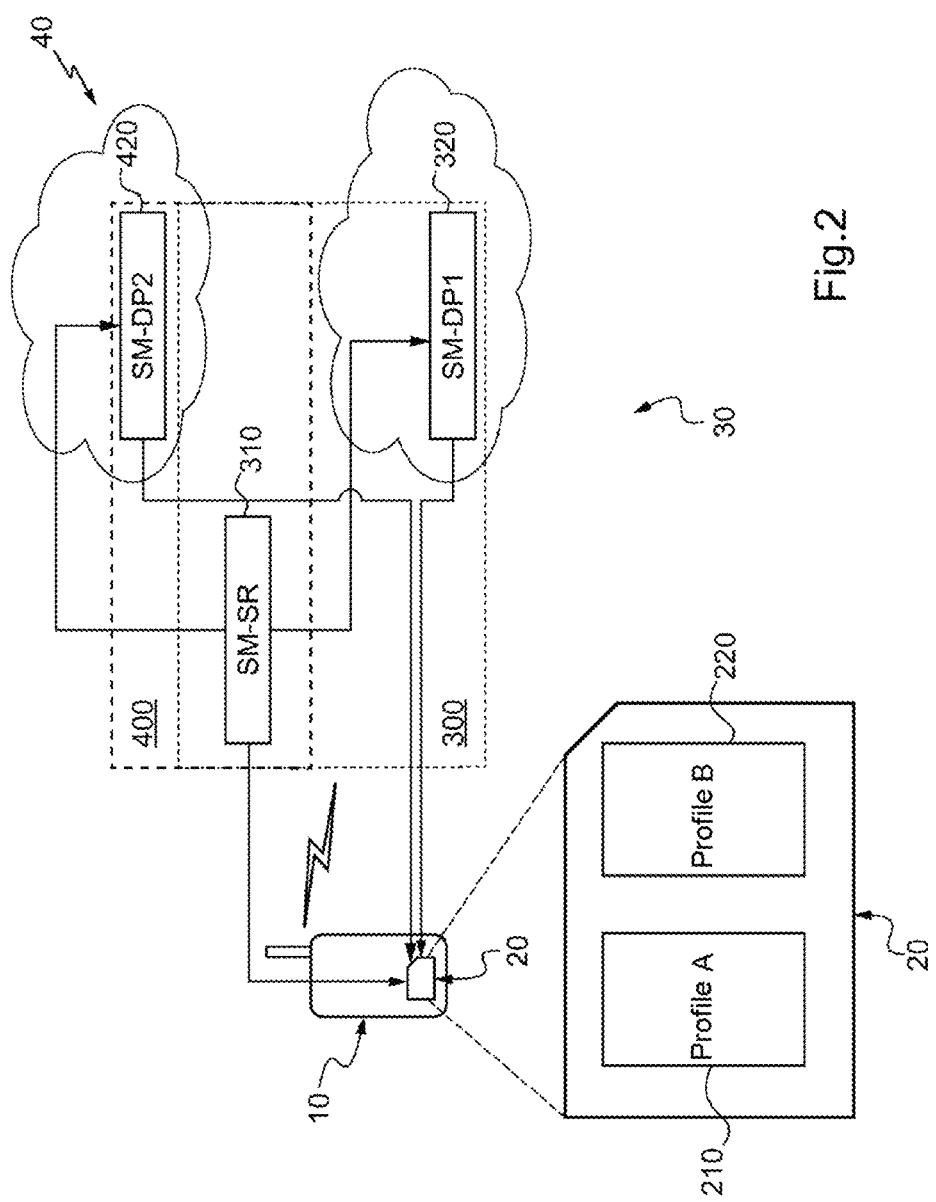
FIG. 2 shows a schematic illustration of an example of a communication system, in which one form of embodiment of the present invention can be deployed.

FIG. 2 shows a schematic representation of an example of a communication system in which one form of embodiment of the present invention can be deployed.

Specifically, FIG. 2 represents a host device 10 comprising a secure element 20, a first communication network 30 and a second communication network 40.

The first communication network 30 and the second communication network 40 are, for example, mobile telephone networks.

The host device 10 and the secure element 20 are represented in FIG. 1.

The host device 10 is, for example, a portable terminal, such as a mobile telephone or a tablet, and the secure element 20 is an embedded secure element, such as a card of the eUICC type.

In the form of embodiment described, the secure element 20 can communicate with both communication networks 30, 40.

An operator of a communication network 30, 40 is represented by a data preparation server 320, 420, designated as "SM-DP" (which stands for "Subscription Manager Data Preparation"). A SM-DP server 320, 420 generates profiles and delivers them to the secure element 20.

Thus, in the form of embodiment described, two SM-DP servers respectively represent two operators of the two communication networks 30, 40.

A SM-SR server 310 (which stands for "Subscription Manager Secure Routine") is a representative entity of the secure element 20, and is configured to communicate with the SM-DP servers 320, 420.

The combination formed by a SM-DP server 320, 420, and by the single SM-SR server 310, constitutes a subscription management server, designated as "SM" (which stands for "Subscription Manager") 300, 400.

Indeed, when a single SM-SR server 310 is employed, this is a "virtual" SM server.

The roles of the secure routing server, or SM-SR server 310, and of the data preparation server, or SM-DP server 320, 420 are defined in the standards GSMA 12FAST.13 and GSMA 12FAST-15. The SM-SR server 310 is specifically responsible for the respective establishment of a secure channel between the communication network 30, 40 and the secure element 20, in order to permit the loading, activation, deactivation and deletion of profiles in the secure element 20. Specifically, the key role of the SM-DP server 320, 420 is the preparation of data for profiles, and the installation of the profile on the secure element 20.

In these forms of embodiment, in order to facilitate the management of profiles, the secure element 20 comprises a profile registry, comprising a database in which a certain number of information elements on profiles are saved, including, for example, their respective unique identifier.

In the exemplary embodiment represented in FIG. 2, two profiles, a first profile 210, or profile A, and a second profile 220, or profile B, are installed in the secure element 20.

For example, the first profile 210 is associated with the first communication network 30, and the second profile 220 is associated with the second communication network 40.

Accordingly, the host device 10, and specifically the secure element 20, can communicate, for example, with the communication networks 30, 40, by means of the first profile 210 and the second profile 220 respectively.

Obviously, the number of profiles installed in the secure element 20, and the number of SM-DP servers connected to the SM-SR server, can be greater than two.

In the example represented, the first profile 210, or profile A, corresponds to the commonly active profile. Accordingly, the host device 10 can communicate with the first communication network 30 by means of the first profile 210.

In the example represented, the second profile 220, or profile B, corresponds to the profile having the activated fall-back attribute.

Thus, in the event of the initiation of a fall-back mechanism, the second profile 220 is activated to replace the first profile 210. Consequently, in the event of a problem in the operation of the secure element 20 when the first profile 210 is active, the second profile 220 is activated in turn, such that the first profile 210 is then rendered inactive. The host device 10 can then connect to the second communication network 40, and can be used for communication.

It will be observed that only one profile at a time can be activated in the secure element 20, and only one profile at a time can assume the activated fall-back attribute.

Figure 3:
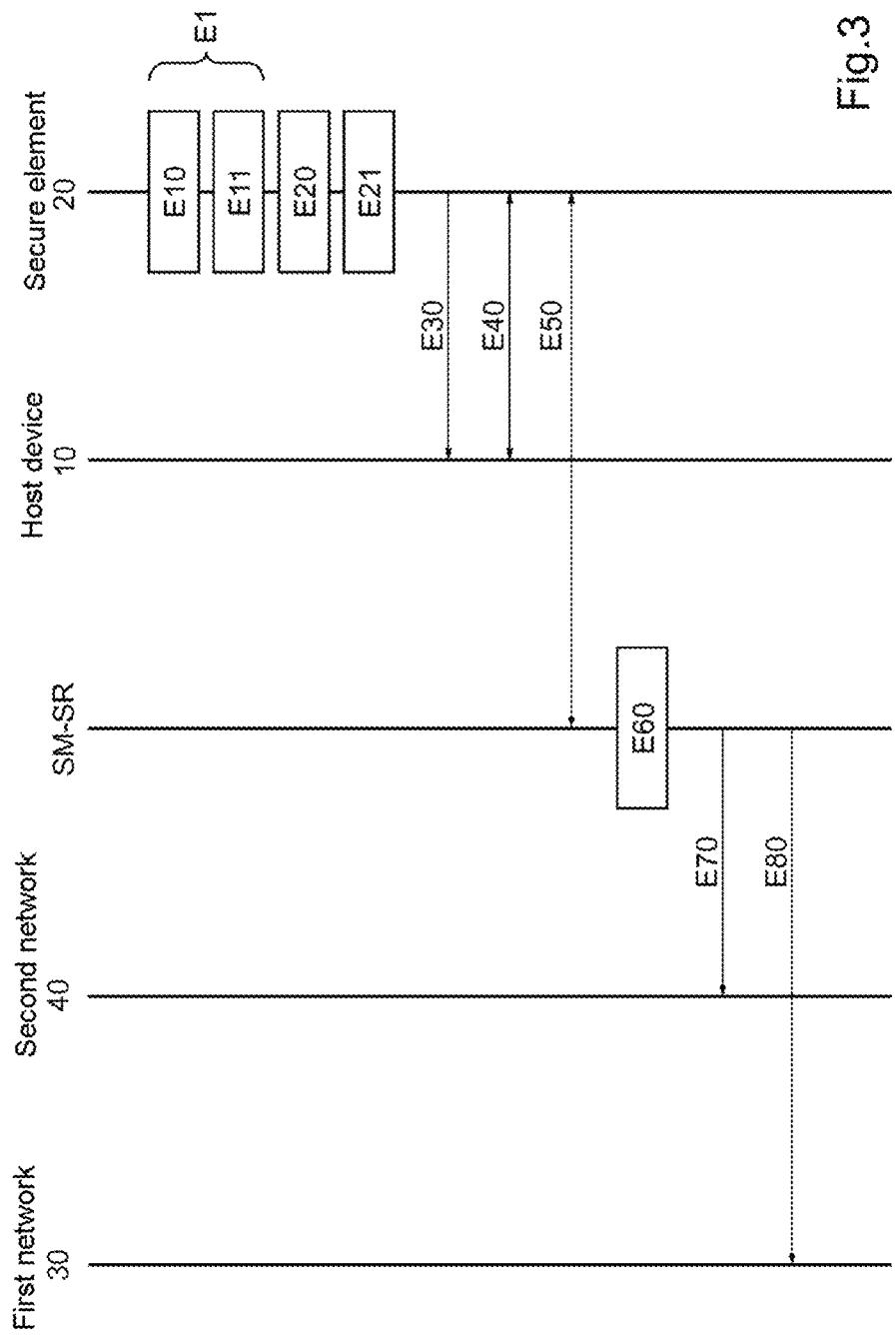
FIGS. 3 and 4 show schematic representations of a method for changing a profile, according to one form of embodiment of the invention.

FIG. 3 shows a schematic representation of one form of embodiment of a method of managing profiles in a secure element 20, wherein the secure element 20 comprises the first profile 210, or the active profile A.

The method comprises a verification step E1 pertaining to security with regard to the first profile 210.

In the form of embodiment described, this verification E1 pertaining to security with regard to the first profile 210 comprises a verification of the authorization for access of a user to the first profile 210.

For example, verification of the authorization for access of a user comprises a step for the verification E10 of a personal identification number (PIN) associated with the first profile 210.

In one form of embodiment, verification of a personal identification number is executed a predetermined number of times n, for example three.

When a problem pertaining to security with regard to the first profile 210 is detected, specifically in the event of one or more successive failures in the verification of the PIN code, a message containing representative information of an error is generated.

Optionally, when a message containing representative information of an error is generated during the verification E10 of the personal identification number, the verification of the authorization of access of a user further comprises the verification E11 of a personal unblocking key (PUK) associated with the first profile 210.

As in the case of the verification of the personal identification number, verification E11 of the personal unblocking key is executed a predetermined number of times m, for example three.

In another, unrepresented form of embodiment, verification of the authorization of access of a user can comprise, in addition to or in place of verifications of the personal identification number and of the personal unblocking key, verification of authentication data for the user, for example biometric data which permit the identification of the user.

Verification of a personal identification number, or a personal unblocking key, or of biometric data, is executed by the comparison of data which are input to the secure element 20 via an interface with data which are stored in (unrepresented) memory facilities of the secure element 20. Verifications of this type are verifications which are familiar to a person skilled in the art, and require no further description here.

When at least one of the verifications of the authorization of access of a user to the first profile 210 terminates in a failure, a message containing representative information of an error, and therefore of a security failure, is generated. The first profile 210 is blocked as a result, and a blocking situation is generated.

When a failure in verification pertaining to security with regard to the first profile 210 is detected, the method comprises a step for the blocking of the first profile 210 contained in the secure element 20.

Further to this blocking step, the secure element 20 can no longer use the first communication network 30.

When a blocking situation of the first profile 210, or profile A, is generated, the method of managing profiles further comprises a step for the deactivation E20 of the first profile 210, followed by a step for the activation E21 of the second profile 220, or profile B, to which the fall-back attribute is assigned. Conventional mechanisms for the activation and deactivation of profiles can be deployed.

Once the first profile 210 has been deactivated and the second profile 220 is activated, the secure element 20 generates, in a transmission step E30, a command for the attention of the host device 10, wherein this command triggers a reset of the secure element and, accordingly, a new procedure E40 for the association of said secure element with a communication network, using the active profile, i.e., in the present case, association with the second communication network 40 using the second profile 220.

The command generated by the secure element 20 in the transmission step E30 comprises, for example, a REFRESH command of the type described in standard GSMA 12FAST.15, specifically in para 3.16 concerning the fall-back activation procedure, resulting in the restarting of the secure element 20.

This start-up trips the association procedure E40 with the second network 40 in accordance with conventional mechanisms. The secure element 20 then deploys a step for the notification 50 of the deactivation of the first profile 210 and the activation of the second profile 220 to the SM-SR server. During this notification step E50, the secure element 20 initiates a notification procedure of the type described in para 4.1.1.11 of standard GSMA 12FAST.15.

Notification of the deactivation of the first profile 210 and the activation of the second profile 220 to the SM-SR server is transmitted, for example, by SMS. Notification transmitted to the SM-SR server, for example by SMS, contains a notification of the "tag" type, i.e. encoded data for the representation of a given message.

Thus, for example, according to standard GSMA 12FAST.15, the tag "04" indicates that a profile has been changed further to a fall-back procedure, and the tag "05" indicates that a profile has been changed further to a fall-back procedure with no prior request to the SM-SR server.

According to one form of embodiment, a feature not provided in the standard, for example the tag "06" (although any other value which has not already been used may be appropriate), is added in order to indicate the deactivation of the first profile 210 and the activation of the second profile 220, further to the detection of a failure during the verification step E1 involving the first profile, or the active profile, for the use of said active profile. For example, this failure is a security failure detected during a verification step pertaining to the security of the first profile.

It will be observed that the verification pertaining to the first profile is a local verification, i.e. is deployed in the secure element 20.

During this notification procedure, the SM-SR management server 310, which receives this notification, is thus notified that a fall-back mechanism has been deployed further to the detection of a failure, such that the profile which was active (in this case the first profile 210) has been deactivated, and another fall-back profile (in this case the second profile 220) has been activated.

All the information pertaining to the secure element (described as "EIS" in standards GSMA 12FAST.13 and GSMA 12FAST.15, wherein "EIS" stands for "eUICC Information Set") which is logged in the SM-SR server is then updated in an update step E60, by way of a practical declaration of the second profile 220 as the active profile and the first profile 210 as the deactivated profile in the communication network infrastructures.

Thereafter, in a first notification step E70, the SM-SR server notifies the operator of the second communication network 40 that the second profile 220 has been activated.

Moreover, in a second notification step E80, the SM-SR server notifies the operator of the first communication network 30 that the first profile 210 has been deactivated.

It will be observed that steps E30 to E80 are based upon the steps described in the standard GSMA 12FAST.15, specifically in para 3.16 relating to the fall-back activation procedure.

Figure 4:
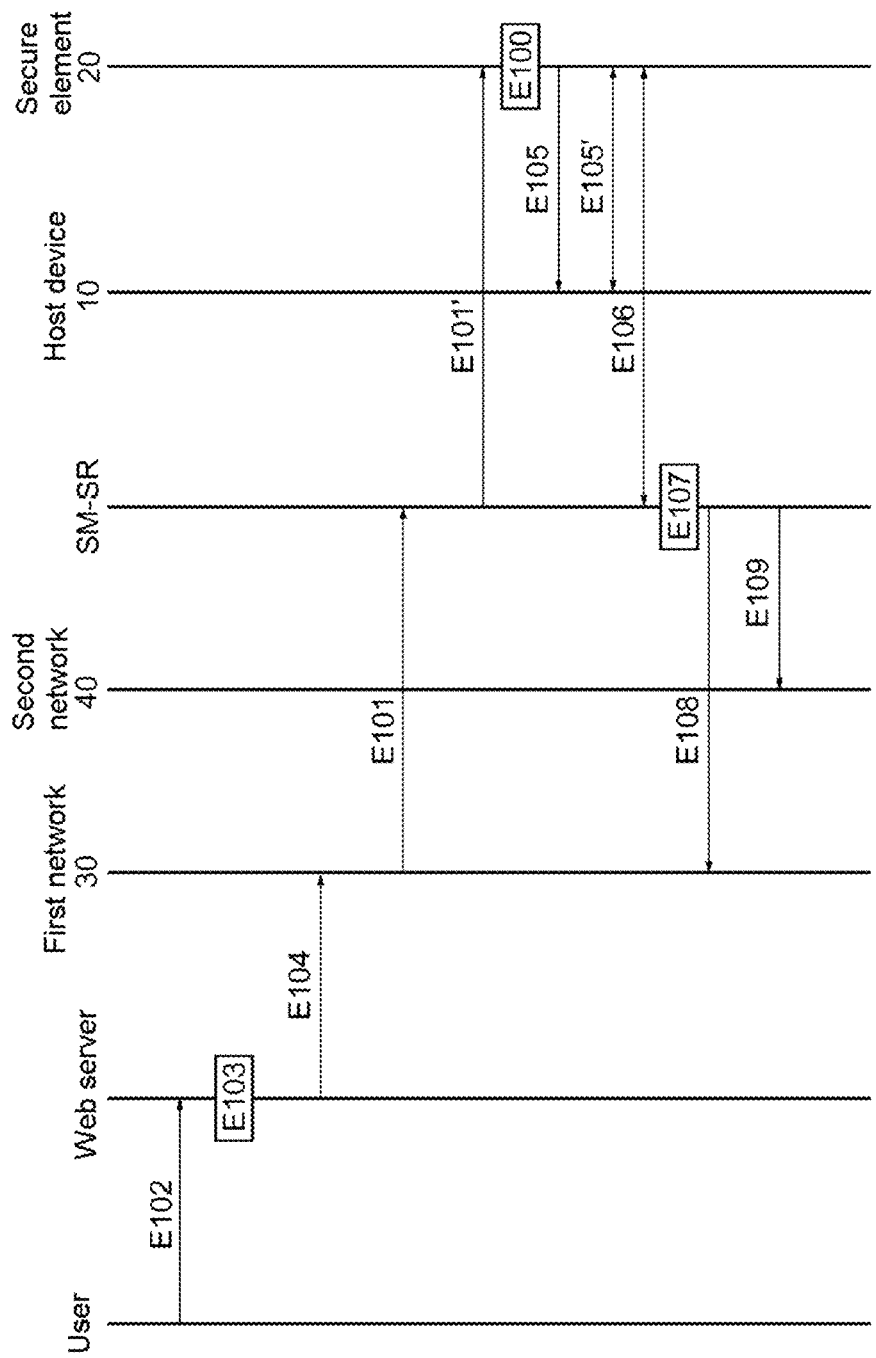

FIG. 4 represents steps, additionally to those shown in FIG. 3, of the method of managing profiles according to one form of embodiment of the invention.

When a blocking situation of the first profile 210 has been generated (in general, further to the detection of a failure) and, in consequence, the first profile 210 has been deactivated and the second profile 220 has been activated, in order to permit the use of the host device 10 and of the secure element 20, the method of managing profiles can comprise steps pertaining to the reactivation of the first profile 210.

Thus, the method of managing profiles can further comprise a step E100 for the reactivation of the first profile 210, wherein this reactivation step E100 comprises the deactivation of the second profile 220, followed by the activation of the first profile 210.

The step for the reactivation of the first profile 210 is deployed upon the reception E101', in the secure element 210, of a request for the activation of the first profile 210, generated by the SM-SR server.

In one form of embodiment, the activation request originates from the first communication network 30, associated with the first profile 210.

Specifically, a first activation request E101 for said first profile 210 is addressed to the SM-SR server which, in turn, responds by generating a second activation request E101' of the first profile 210, which is addressed to the secure element 20.

In the form of embodiment represented in FIG. 4, the activation request E101 of the first profile 210 is generated at the request of a user.

For example, the user requests the generation E102 of a new personal identification number for the first profile 210, which has been blocked further to multiple failed entries of a PIN or PUK code, or authentication data.

To do this, the user connects to a WEB server which is associated with the first communication network 30.

In accordance with known procedures, the WEB server of the communication network 30, in a verification step E103, verifies the identity of the user and their authorization for access to the first communication network 30, for example, by requesting that the user enters his name, address, date of birth, identification number, etc.

Once the WEB server has verified that the identity of the user is correct, and that he is authorized to access the first communication network 30 using the first profile 210, the WEB server generates, in a generation step, new data pertaining to the authorization for access of the user to the first communication network 30 using the first profile 210, for example a new personal identification number (PIN, PUK) associated with the first profile 210.

The new personal identification number associated with the first profile 210 is addressed E104, E101 to the SM-SR server, wherein the SM-SR server in turn addresses the new personal identification number to the secure element 20 by means of the activation request E101'. The personal identification number is thus saved in the secure element 20, in conjunction with the first profile 210, for subsequent verifications pertaining to the authorization for access of the user to the first profile 210.

According to another form of embodiment, which is not represented in the figures, the activation request for the first profile is generated upon the expiry of a predetermined time period with effect from the generation of the situation for the blocking of the first profile 210.

Specifically, the activation request for the first profile is generated upon the expiry of a predetermined time period with effect from the reception, by the operator of the first network, of the notification E80.

As a variant, the personal identification number (PIN/PUK) associated with the first profile 210 is automatically unblocked after the expiry of a second predetermined time period with effect from the notification step E80.

Once the first profile 210 has been reactivated and the second profile 220 has been deactivated, the secure element 20 then generates, in a generation step E105, a command for the attention of the host device 10, wherein this command triggers a procedure E105' for the association of the first profile 210 with the first communication network 30.

The command generated by the secure element 20 in the generation step E105 comprises, for example, a REFRESH command, as described in standard GSMA 12FAST.15, specifically in para 3.16 pertaining to the fall-back activation procedure, resulting in the restarting of the secure element 20.

This start-up initiates a new procedure of association E105' with the first network 30, in accordance with conventional mechanisms. Thereafter, the secure element 20 deploys a step for the notification E106 of the deactivation of the second profile 220 and the activation of the first profile 210. In this notification step E106, the secure element 20 initiates a notification procedure, as described in para 4.1.1.11 of standard GSMA 12FAST.15

Notification of the deactivation of the first profile 210 and the activation of the second profile 220 to the SM-SR server is transmitted, for example, by SMS. The notification transmitted to the SM-SR server, for example by SMS, includes a notification of the "tag" type, i.e. the employment of encoded data for the representation of a given message.

As described previously, the tag "06" can be used for the notification of the deactivation of the second profile 210 and the activation of the first profile 220.

By this notification procedure, the SM-SR server is thus informed that a reactivation of the first profile 210 has been deployed.

The combination of information EIS pertaining to the secure element which is logged in the SM-SR server will then be updated in an updating step E107, in order to configure the first profile 210 as the active profile and the second profile 210 as the profile which has been deactivated.

Thereafter, in a first notification step E108, the SM-SR server notifies the operator of the first communication network 30 that the first profile 210 has been reactivated.

Moreover, in a second notification step E109, the SM-SR server notifies the operator of the second communication network 40 that the second profile 210 has been deactivated.

Further to these notification steps E108, E109, the user can use the host device 10 by means of the first profile 210.

It will be observed that the steps E101 to E109 are based upon the steps described in the standard GSMA 12FAST.15, specifically in para 3.16 pertaining to the fall-back activation procedure.

The invention claimed is:

1. A method of managing profiles in a secure element, wherein the secure element comprises a first profile associated with a first communication network, and a second profile associated with a second communication network, wherein the first profile is active, and the method comprises:
deactivating said first profile; and
activating said second profile;
wherein the deactivation and the activation occur upon detection of a failure during a local verification pertaining to said first profile for the use of said first profile, said local verification being performed in the secure element, and said failure being relative to a security failure of the first profile or to an operating failure of the first profile.

2. The method of managing profiles as claimed in claim 1, wherein the local verification comprises verification in said secure element of the authorization for access of a user to said first profile, wherein a security failure is detected in the secure element, in the event of the failure of verification.

3. The method of managing profiles as claimed in claim 2, wherein the verification in the secure element of the authorization for the access of a user comprises the verification of a personal identification number associated with said first profile.

4. The method of managing profiles as claimed in claim 3, wherein the verification in the secure element of the authorization for the access of a user comprises the verification of a personal unblocking key associated with said first profile.

5. The method of managing profiles as claimed in claim 3, wherein the verification in the secure element of the authorization for the access of a user comprises the verification of authentication data for said user.

6. The method of managing profiles as claimed in claim 3, wherein local verification comprises verification of the integrity of said first profile, in order to detect the corrupted operation of the latter.

7. The method of managing profiles as claimed in claim 2, wherein the verification in the secure element of the authorization for the access of a user comprises the verification of a personal unblocking key associated with said first profile.

8. The method of managing profiles as claimed in claim 7, wherein the verification in the secure element of the authorization for the access of a user comprises a verification of authentication data for said user.

9. The method of managing profiles as claimed in claim 2, wherein the verification in the secure element of the authorization for the access of a user comprises the verification of authentication data for said user.

10. The method of managing profiles as claimed in claim 2, wherein local verification comprises a verification of the integrity of said first profile, in order to detect the corrupted operation of the latter.

11. The method of managing profiles as claimed in claim 1, wherein the local verification comprises a verification of the integrity of said first profile, in order to detect the corrupted operation of the latter.

12. The method of managing profiles as claimed in claim 11, wherein the verification of the integrity of said first profile is executed during an activation phase of said first profile.

13. The method of managing profiles as claimed in claim 1, further comprising a reactivation of said first profile, wherein the reactivation comprises the deactivation of said second profile and the activation of said first profile.

14. The method of managing profiles as claimed in claim 13, wherein the reactivation of the first profile is deployed upon the reception, in said secure element, of a request for the activation of the first profile (210), wherein said activation request originates from the first communication network, associated with said first profile.

15. The method of managing profiles as claimed in claim 14, wherein said request for the activation of said first profile is generated at the request of a user.

16. The method of managing profiles as claimed in claim 14, wherein said request for the activation of said first profile is generated upon the expiry of a predetermined time interval, with effect from a notification of the deactivation of said first profile in the secure element.

17. A secure element comprising a first profile, associated with a first communication network, and a second profile, associated with a second communication network, wherein said first profile is active, and the secure element is configured to:
deactivate said first profile; and
activate said second profile;
wherein the secure element is configured such that the deactivation and the activation occur upon detection of a failure during a local verification pertaining to said first profile for the use of this said first profile, said local verification being performed in the secure element, and said failure being relative to a security failure of the first profile or to an operating failure of the first profile.

18. The secure element as claimed in claim 17, wherein said secure element is a card of the embedded UICC type.

19. A host device, comprising:
a secure element that includes:
a first profile, associated with a first communication network; and
a second profile, associated with a second communication network, wherein said first profile is active, and the secure element is configured to:
deactivate said first profile, and
activate said second profile, wherein,
the secure element is configured such that the deactivation and the activation occur upon detection of a failure during a local verification pertaining to said first profile for the use of this said first profile,
said local verification is performed in the secure element, and
said failure is relative to a security failure of the first profile or to an operating failure of the first profile.

20. The host device as claimed in claim 19, wherein said host device is a portable communication terminal.

* * * * *